(12) United States Patent
Chiu

(10) Patent No.: US 11,913,853 B2
(45) Date of Patent: Feb. 27, 2024

(54) INSPECTION DEVICE AND INSPECTION METHOD FOR SPEED VARIATOR

(71) Applicant: Fulian Yuzhan Precision Technology Co., Ltd, Shenzhen (CN)

(72) Inventor: Long-En Chiu, New Taipei (TW)

(73) Assignee: Fulian Yuzhan Precision Technology Co., Ltd, Shenzhen (CN)

( * ) Notice: Subject to any disclaimer, the term of this patent is extended or adjusted under 35 U.S.C. 154(b) by 316 days.

(21) Appl. No.: 17/341,637

(22) Filed: Jun. 8, 2021

(65) Prior Publication Data

US 2021/0389212 A1    Dec. 16, 2021

(30) Foreign Application Priority Data

Jun. 16, 2020 (CN) .......................... 202010550013.1

(51) Int. Cl.
*G01M 13/021* (2019.01)
*G01B 21/16* (2006.01)
*F16H 61/12* (2010.01)

(52) U.S. Cl.
CPC .......... *G01M 13/021* (2013.01); *F16H 61/12* (2013.01); *G01B 21/16* (2013.01)

(58) Field of Classification Search
CPC .... G01M 13/003; G01M 3/26; G01M 15/044; G01M 13/00; G01M 15/02; G01M 17/10; G01M 99/00; G01M 17/007; G01M 3/205; G01M 13/045; G01M 7/08; G01M 13/021; G01M 17/0074; G01M 17/02; G01M 17/022; G01M 17/04; F16H 61/662; F16H 61/66259; F16H 47/04; F16H 2037/088; F16H 37/022; F16H 61/702; F16H 37/086; F16H 61/66; F16H 37/021; F16H 2037/023; F16H 2037/0886; F16H 61/66272; F16H 9/18; F16H 37/0846; F16H 15/38; F16H 55/56; F16H 61/02; F16H 61/6648; F16H 61/12; F16H 61/04; F16H 63/50; F16H 37/084; F16H 2200/2005; F16H 61/70; F16H 55/563; F16H 2200/2007; F16H 63/067; F16H 61/66254;
(Continued)

(56) References Cited

U.S. PATENT DOCUMENTS 4,019,031 A * 4/1977 Young ................. G06M 3/00
235/94 R
5,029,486 A * 7/1991 Mercat ................. F16H 29/16
280/236
(Continued)

FOREIGN PATENT DOCUMENTS

CN    110319782 A    10/2019
JP    2015-142454    8/2015

*Primary Examiner* — Andre J Allen
(74) *Attorney, Agent, or Firm* — ScienBiziP, P.C.

(57) ABSTRACT

An inspection method for a speed variator including a first gear and a second gear includes obtaining a first position of the first gear based on a contact between a first gear tooth of the first gear and a third gear tooth of the second gear, driving the first gear to rotate in a first direction to bring a second gear tooth of the first gear into contact with the third gear tooth, obtaining a second position of the first gear based on a contact between the second gear tooth and the third gear tooth, and determining a condition of the speed variator based on the first position and the second position. Also, an inspection device is provided.

10 Claims, 9 Drawing Sheets

(58) Field of Classification Search
CPC ............. F16H 61/00; F16H 2037/0866; F16H 2037/0873; F16H 2061/6614; F16H 59/44; F16H 15/28; F16H 61/16; F16H 2037/104; F16H 59/18; F16H 61/664; F16H 15/52; F16H 2037/102; F16H 3/728; F16H 61/0213; F16H 61/6649; F16H 2059/366; F16H 37/0806; F16H 2015/383; F16H 61/66245; F16H 15/503; F16H 2037/026; F16H 37/0853; F16H 9/10; F16H 2061/1208; F16H 3/72; F16H 2037/025; F16H 2200/2023; F16H 55/54; F16H 2037/0893; F16H 37/02; F16H 2200/0034; F16H 3/66; F16H 3/725; F16H 59/42; F16H 59/40; F16H 61/472; F16H 2200/2012; F16H 33/08; F16H 29/04; F16H 9/14; F16H 2009/163; F16H 2059/186; F16H 2200/201; F16H 3/006; F16H 57/023; F16H 57/0489; F16H 61/462; F16H 3/722; F16H 37/08; F16H 59/54; F16H 61/08; F16H 61/32; F16H 9/16; F16H 2037/103; F16H 2037/106; F16H 2061/6605; F16H 2200/2035; F16H 61/0403; F16H 61/14; F16H 59/68; F16H 59/70; F16H 61/6625; F16H 2037/101; F16H 2061/6616; F16H 47/02; F16H 61/061; F16H 9/12; F16H 9/24; F16H 2059/147; F16H 2061/0087; F16H 2200/0039; F16H 3/663; F16H 61/66227; F16H 59/48; F16H 61/0204; F16H 61/10; F16H 2059/363; F16H 2061/6615; F16H 59/14; F16H 61/0021; F16H 2059/704; F16H 3/54; F16H 3/76; F16H 1/32; F16H 2061/0096; F16H 2061/66277; F16H 3/724; F16H 37/10; F16H 59/36; F16H 61/0437; F16H 61/66236; F16H 2001/2881; F16H 2200/2041; F16H 29/08; F16H 37/046; F16H 2061/66204; F16H 29/20; F16H 57/035; F16H 61/0025; F16H 61/66268; F16H 2061/6601; F16H 2061/66218; F16H 29/16; F16H 3/62; F16H 37/06; F16H 55/38; F16H 59/20; F16H 15/20; F16H 15/50; F16H 2047/045; F16H 2059/663; F16H 2061/0015; F16H 2061/1264; F16H 2200/0043; F16H 2200/0052; F16H 2200/2046; F16H 3/089; F16H 39/32; F16H 59/06; F16H 59/22; F16H 59/46; F16H 59/72; F16H 61/0206; F16H 61/66231; F16H 61/686; F16H 2048/362; F16H 2059/446; F16H 2059/465; F16H 2059/6861; F16H 2059/702; F16H 2200/2038; F16H 48/06; F16H 48/10; F16H 57/0487; F16H 59/044; F16H 59/66; F16H 61/21; F16H 61/684; F16H 63/30; F16H 63/302; F16H 63/3023; F16H 63/46; F16H 9/125; F16H 15/12; F16H 2059/0239; F16H 2061/6612; F16H 2312/14; F16H 25/06; F16H 59/16; F16H 61/0276; F16H 61/42; F16H 61/431; F16H 15/14; F16H 2009/166; F16H 47/00; F16H 48/36; F16H 57/031; F16H 59/04; F16H 63/062; F16H 9/04; F16H 2041/246; F16H 2059/0295; F16H 2200/2097; F16H 2342/00; F16H 33/04; F16H 37/12; F16H 57/0427; F16H 59/141; F16H 61/143; F16H 63/06; F16H 9/20; F16H 13/06; F16H 13/08; F16H 13/10; F16H 15/40; F16H 2057/0203; F16H 2059/183; F16H 2061/0492; F16H 2061/1284; F16H 2061/6608; F16H 2061/66295; F16H 25/04; F16H 2702/02; F16H 3/34; F16H 3/44; F16H 3/64; F16H 3/74; F16H 37/043; F16H 39/02; F16H 48/08; F16H 57/033; F16H 59/38; F16H 61/0202; F16H 61/421; F16H 61/66263; F16H 15/18; F16H 15/22; F16H 2057/02043; F16H 2059/082; F16H 2061/1232; F16H 2061/166; F16H 2200/0047; F16H 3/093; F16H 3/727; F16H 55/52; F16H 57/02; F16H 59/24; F16H 59/78; F16H 61/30; F16H 61/4096; F16H 61/6646; F16H 63/502; F16H 15/04; F16H 2057/02013; F16H 2057/02086; F16H 2059/148; F16H 2059/6892; F16H 2061/009; F16H 2061/66213; F16H 2063/508; F16H 2200/0065; F16H 2302/00; F16H 3/08; F16H 3/091; F16H 3/42; F16H 45/02; F16H 57/0457; F16H 59/74; F16H 61/20; F16H 61/4035; F16H 63/48; F16H 9/08; F16H 1/28; F16H 15/54; F16H 15/56; F16H 2057/005; F16H 2057/014; F16H 2059/6823; F16H 2061/0477; F16H 2061/0496; F16H 2061/085; F16H 2061/1288; F16H 2061/66281; F16H 2200/0056; F16H 2312/02; F16H 3/721; F16H 33/02; F16H 37/065; F16H 37/0833; F16H 47/065; F16H 57/037; F16H 57/0413; F16H 59/0204; F16H 59/50; F16H 61/009; F16H 61/26; F16H 61/433; F16H 61/47; F16H 61/68; F16H 61/688; F16H 63/20; F16H 15/42; F16H 2003/445; F16H 2048/104; F16H 2048/106; F16H 2059/746; F16H 2061/023; F16H 2061/0232; F16H 2061/0244; F16H 2061/1228; F16H 2061/1268; F16H 2061/1292; F16H 2061/6609; F16H 2061/661; F16H 2061/66286; F16H 2063/3076; F16H 2200/003; F16H 2306/00; F16H 29/18; F16H 3/145; F16H 37/042; F16H 37/0826; F16H 39/14; F16H 57/0484; F16H 61/06; F16H 63/065; F16H 9/00; F16H 9/26; F16H 13/14; F16H 15/10; F16H 2001/327; F16H 2057/02056; F16H 2057/02065; F16H 2061/0037; F16H 2061/0234; F16H 2061/0411; F16H 2061/0425; F16H 2061/163; F16H 2061/6618; F16H 2063/504; F16H 2200/0004; F16H 2200/202; F16H 3/0915; F16H 3/666; F16H 57/021; F16H 57/027; F16H 57/0416; F16H 57/0471; F16H 57/049; F16H 61/0031; F16H 61/065; F16H 63/304; F16H 63/34; F16H 63/345; F16H 63/42; F16H 1/46; F16H 15/506; F16H 2015/386; F16H 2045/0247; F16H 2059/443; F16H 2061/0078; F16H 2061/0216; F16H 2061/126; F16H 2061/283; F16H 2063/005; F16H 2200/0008; F16H
2306/20; F16H 2312/022; F16H 3/001;
F16H 3/095; F16H 3/385; F16H 35/02;
F16H 35/10; F16H 37/00; F16H 39/18;
F16H 57/04; F16H 61/068; F16H 63/18;
F16H 63/38; F16H 1/48; F16H 15/24;
F16H 2001/325; F16H 2003/0931; F16H
2045/021; F16H 2045/0284; F16H
2045/0294; F16H 2059/0256; F16H
2059/506; F16H 2061/0012; F16H
2061/064; F16H 2061/1224; F16H
2061/128; F16H 2061/165; F16H
2061/6611; F16H 2306/44; F16H
2306/46; F16H 2306/48; F16H 2306/52;
F16H 29/02; F16H 3/363; F16H 3/366;
F16H 3/70; F16H 37/04; F16H 37/0813;
F16H 48/12; F16H 48/30; F16H 49/005;
F16H 55/34; F16H 57/0006; F16H
57/0441; F16H 57/0446; F16H 57/0476;
F16H 59/02; F16H 59/0208; F16H
61/0295; F16H 61/2807; F16H 61/48;
F16H 61/705; F16H 63/04; F16H 63/28;
F16H 63/3003; F16H 63/36; F16H 15/48;
F16H 19/06; F16H 2003/0803; F16H
2003/123; F16H 2007/0876; F16H
2019/0681; F16H 2037/049; F16H
2037/107; F16H 2037/108; F16H
2048/082; F16H 2048/085; F16H
2048/305; F16H 2048/405; F16H
2057/0235; F16H 2059/0221; F16H
2061/0034; F16H 2061/002; F16H
2061/1204; F16H 2061/124; F16H
2061/1252; F16H 2061/1256; F16H
2061/2823; F16H 2061/6604; F16H
2063/3086; F16H 21/50; F16H
2200/0095; F16H 2300/14; F16H
2306/42; F16H 2306/50; F16H 3/083;
F16H 3/56; F16H 33/185; F16H 39/10;
F16H 48/24; F16H 55/12; F16H 55/17;
F16H 55/171; F16H 55/36; F16H 57/028;
F16H 57/03; F16H 57/0415; F16H
57/0423; F16H 59/10; F16H 59/105;
F16H 63/3408; F16H 63/3483; F16H
7/00; F16H 1/06; F16H 1/16; F16H
1/2827; F16H 1/36; F16H 15/34; F16H
15/44; F16H 2007/0874; F16H
2007/0893; F16H 2037/045; F16H
2059/085; F16H 2059/144; F16H
2059/6807; F16H 2061/0227; F16H
2061/122; F16H 2061/1244; F16H
2061/1272; F16H 2061/242; F16H
2061/2853; F16H 2061/66209; F16H
2061/6629; F16H 21/14; F16H 21/20;
F16H 21/34; F16H 2200/0021; F16H
2200/0078; F16H 2200/0082; F16H
2200/0086; F16H 2200/0091; F16H
2200/2064; F16H 2200/2066; F16H
2200/2082; F16H 2200/2084; F16H
2312/09; F16H 2312/20; F16H 25/20;
F16H 29/12; F16H 3/097; F16H 3/12;
F16H 3/14; F16H 3/46; F16H 3/50; F16H
3/60; F16H 33/10; F16H 35/00; F16H
37/027; F16H 37/082; F16H 37/124;
F16H 39/24; F16H 41/26; F16H 41/28;
F16H 41/30; F16H 47/06; F16H 47/08;

F16H 48/18; F16H 55/10; F16H 57/025;
F16H 57/038; F16H 57/0404; F16H
57/0408; F16H 57/0409; F16H 57/0412;
F16H 57/0447; F16H 57/0473; F16H
57/0475; F16H 57/0479; F16H 57/08;
F16H 59/042; F16H 61/0003; F16H
61/0028; F16H 61/0059; F16H 61/0248;
F16H 61/18; F16H 61/40; F16H 61/4192;
F16H 63/32; F16H 63/40; F16H 1/14;
F16H 1/227; F16H 15/00; F16H 15/30;
F16H 15/36; F16H 19/025; F16H
2003/0807; F16H 2003/0826; F16H
2003/0938; F16H 2003/447; F16H
2007/0863; F16H 2007/0885; F16H
2007/0887; F16H 2037/028; F16H
2037/048; F16H 2045/007; F16H
2045/0205; F16H 2045/0221; F16H
2045/0252; F16H 2045/0278; F16H
2057/0012; F16H 2057/02095; F16H
2057/0335; F16H 2059/0234; F16H
2059/0243; F16H 2059/0269; F16H
2059/087; F16H 2059/142; F16H
2059/462; F16H 2059/666; F16H
2059/683; F16H 2059/6853; F16H
2059/6876; F16H 2059/706; F16H
2061/0046; F16H 2061/0253; F16H
2061/0462; F16H 2061/0466; F16H
2061/0481; F16H 2061/0485; F16H
2061/0488; F16H 2061/062; F16H
2061/145; F16H 2061/147; F16H
2061/161; F16H 2061/185; F16H
2061/308; F16H 2061/66222; F16H
2061/6644; F16H 2063/305; F16H
2063/3079; F16H 21/54; F16H 2200/006;
F16H 2200/2094; F16H 23/00; F16H
2302/04; F16H 2306/18; F16H 2306/40;
F16H 2312/04; F16H 2342/02; F16H
2342/044; F16H 25/186; F16H 25/2204;
F16H 2700/02; F16H 2702/00; F16H
29/00; F16H 3/085; F16H 3/16; F16H
3/32; F16H 3/36; F16H 3/423; F16H
3/426; F16H 3/58; F16H 33/20; F16H
37/122; F16H 39/06; F16H 39/28; F16H
39/34; F16H 41/04; F16H 43/00; F16H
47/085; F16H 48/11; F16H 48/32; F16H
49/001; F16H 55/084; F16H 55/32; F16H
55/44; F16H 57/00; F16H 57/039; F16H
57/041; F16H 57/043; F16H 57/0434;
F16H 57/0439; F16H 57/0456; F16H
57/0493; F16H 57/0494; F16H 57/082;
F16H 59/00; F16H 59/0217; F16H
49/041; F16H 59/26; F16H 59/56; F16H
59/58; F16H 61/0246; F16H 61/0265;
F16H 61/0267; F16H 61/0293; F16H
61/067; F16H 61/36; F16H 61/4043;
F16H 61/4061; F16H 61/437; F16H
61/465; F16H 61/682; F16H 63/08; F16H
63/12; F16H 63/44; F16H 7/06; F16H
7/08; F16H 7/1281; F16H 7/18; F16H
9/02; F16H 1/20; F16H 1/2863; F16H
13/02; F16H 19/02; F16H 19/04; F16H
19/08; F16H 2001/289; F16H 2001/328;
F16H 2003/008; F16H 2003/0822; F16H
2025/063; F16H 2035/003; F16H
2037/044; F16H 2045/002; F16H

2045/0231; F16H 2045/0257; F16H
2048/204; F16H 2048/265; F16H
2057/012; F16H 2057/02034; F16H
2057/0206; F16H 2057/02069; F16H
2057/02091; F16H 2057/087; F16H
2059/0286; F16H 2059/425; F16H
2059/467; F16H 2059/743; F16H
2061/0081; F16H 2061/0223; F16H
2061/0225; F16H 2061/0422; F16H
2061/0433; F16H 2061/044; F16H
2061/0448; F16H 2061/047; F16H
2061/1212; F16H 2061/1276; F16H
2061/223; F16H 2061/301; F16H
2061/326; F16H 2061/6602; F16H
2061/6603; F16H 2061/6617; F16H
2063/208; F16H 2063/3036; F16H
2063/3053; F16H 2063/3063; F16H
2063/3066; F16H 2063/3089; F16H
2063/324; F16H 21/16; F16H 21/18;
F16H 21/22; F16H 21/42; F16H 21/46;
F16H 2200/00; F16H 2200/0069; F16H
2200/0073; F16H 2200/2015; F16H
2200/2025; F16H 2200/2033; F16H
2200/2043; F16H 2200/2048; F16H
2200/2051; F16H 2200/2053; F16H
2200/2071; F16H 2200/2079; F16H
23/10; F16H 2306/14; F16H 2306/24;
F16H 25/02; F16H 25/08; F16H 27/00;
F16H 2700/00; F16H 2710/00; F16H
2714/02; F16H 2716/02; F16H 2718/22;
F16H 2718/24; F16H 29/06; F16H 29/14;
F16H 29/22; F16H 3/005; F16H 3/087;
F16H 3/10; F16H 3/126; F16H 3/30;
F16H 3/48; F16H 31/001; F16H 33/00;
F16H 35/12; F16H 37/14; F16H 39/04;
F16H 39/36; F16H 39/40; F16H 39/42;
F16H 41/00; F16H 41/24; F16H 48/05;
F16H 48/16; F16H 48/26; F16H 48/27;
F16H 49/00; F16H 53/025; F16H 55/26;
F16H 55/48; F16H 55/49; F16H 57/01;
F16H 57/032; F16H 57/0402; F16H
57/0421; F16H 57/0428; F16H 57/0431;
F16H 57/0436; F16H 57/045; F16H
57/0452; F16H 57/0453; F16H 57/0469;
F16H 57/0491; F16H 57/10; F16H
59/0213; F16H 59/60; F16H 59/62; F16H
61/0251; F16H 61/0262; F16H 61/148;
F16H 61/22; F16H 61/24; F16H 61/28;
F16H 61/34; F16H 61/38; F16H 61/4069;
F16H 61/4148; F16H 61/425; F16H
61/44; F16H 61/452; F16H 61/46; F16H
61/6624; F16H 61/6647; F16H 63/16;
F16H 63/3416; F16H 7/02; F16H 7/0827;
F16H 9/06; G01B 7/008; G01B 7/012;
G01B 7/12; G01B 2003/1064; G01B
21/16; G01B 3/1084

See application file for complete search history.

(56) References Cited

U.S. PATENT DOCUMENTS

| | | | |
|---|---|---|---|
| 6,296,589 B1 * | 10/2001 | Ni | F16H 35/02 |
| | | | 475/221 |
| 8,567,278 B2 * | 10/2013 | Mangelsen | F16H 57/12 |
| | | | 74/440 |
| 2015/0209958 A1 | 7/2015 | Hasegawa | |
| 2018/0126552 A1 | 5/2018 | Jonsson et al. | |
| 2019/0302602 A1 * | 10/2019 | Chen | G03B 21/53 |

* cited by examiner

INSPECTION DEVICE AND INSPECTION METHOD FOR SPEED VARIATOR

CROSS-REFERENCE TO RELATED APPLICATIONS

This application claims priority to Chinese Patent Application No. 202010550013.1 filed on Jun. 16, 2020, the contents of which are incorporated by reference herein.

FIELD

The subject matter herein generally relates to an inspection method and an inspection device for a speed variator.

BACKGROUND

A speed variator is installed in a robot and other devices to amplify or reduce a torque of a driving member to rotate a body. After long-term use, backlash between the gears of a gearbox of the robot increases, causing the robot to gradually fail to meet requirements of positioning accuracy. Generally, an inspection method of a worn gearbox is to command a single axis of the robot to move from different directions to a same end position, and use sensors such as vision cameras or laser trackers to measure changes in the end position of the robot to estimate a gearbox's wear condition. However, this measurement method is complicated and requires external equipment which is costly.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

A speed variator is a mechanical transmission mechanism, which aims at speed transmission. A speed variator comprises speed reducer, speed increaser, and speed converter. The purpose of a speed reducer is to reduce the speed and increase the torque, while a speed increaser is the opposite, and the speed converter is configured to convert the nature of speed, such as convert the speed in one direction to another direction, or convert a rotary action to a linear action. The followings are detailed explanation of the speed reducer as examples.

FIG. 1 and FIGS. 2A-2C show a first embodiment of an inspection method of a speed reducer 200. The speed reducer 200 is applied in a joint of a robot.

Figure 2A:
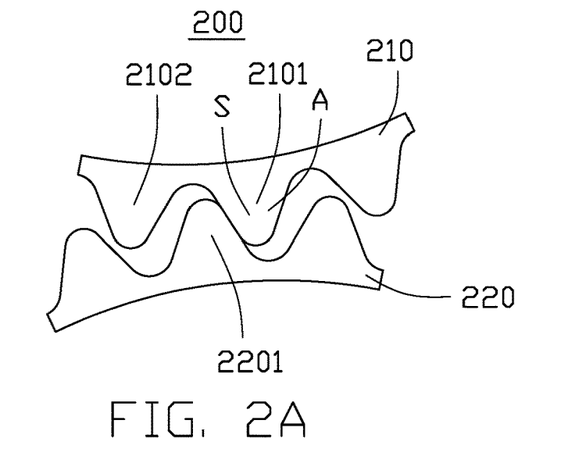
FIGS. 2A-2C are schematic diagrams of a first gear of the speed reducer rotating relative to a second gear of the speed reducer according to the first embodiment of the inspection method.
Figure 2B:
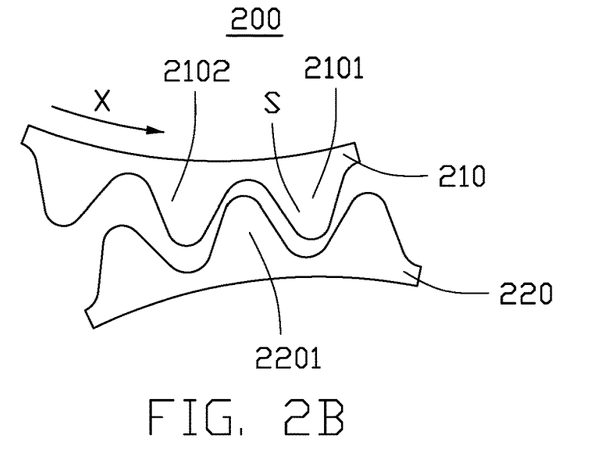
Figure 2C:
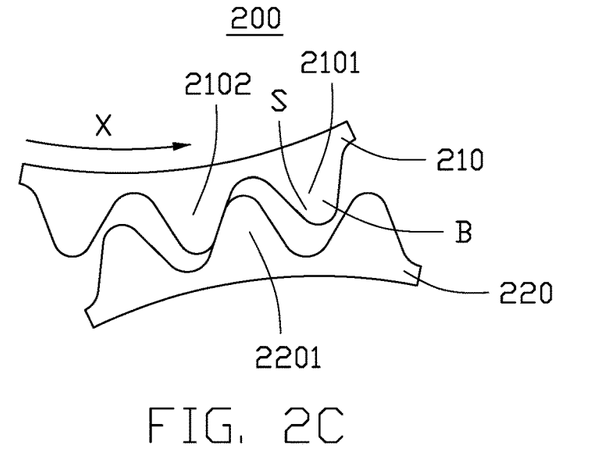

As shown in FIGS. 2A-2C, the speed reducer 200 includes a first gear 210 and a second gear 220. The first gear 210 includes a first gear tooth 2101 and a second gear tooth 2102 adjacent to the first gear tooth 2101, and the first gear tooth 2101 and the second gear tooth 2102 are arranged in a clockwise orientation. The second gear 220 includes third gear tooth 2201. The second gear 220 is configured to move under a driving force of the first gear 210. The first gear 210 is coupled to a motor, and the second gear 220 is coupled to a robot body 300 (shown in FIG. 5). In order to better clarify the inspection method, the third gear tooth 2201 is located between the first gear tooth 2101 and the second gear tooth 2102.

It can be understood that the first gear does not only include the first gear tooth and the second gear tooth, and the third gear does not only include the third gear tooth, both the first gear and the second gear include a plurality of gear teeth. The first gear tooth, the second gear tooth and the third gear tooth are quoted here to illustrate the inspection method.

Referring to FIG. 2A, at block S1, a first position A of the first gear 210 is obtained based on a contact between the first gear tooth 2101 and the third gear tooth 2201.

In one embodiment, since angle changes on the first gear 210 are the same everywhere, any reference point S on the first gear 210 can be selected as a position recording point for description. The position of the reference point S when the first gear tooth 2101 of the first gear 210 is in contact with the third gear tooth 2201 of the second gear 220 is the first position A of the first gear 210. In other embodiments, the first position A of the first gear 210 may be obtained according to other methods.

In one embodiment, when the first gear tooth 2101 and the third gear tooth 2201 of the second gear 220 come in contact, the first gear 210 and the second gear 220 are stationary.

Referring to FIG. 2B, at block S2, the first gear 210 is driven to rotate in a first direction X to bring the second gear tooth 2102 into contact with the third gear tooth 2201. The first direction X is a direction in which the second gear tooth 2102 moves toward the third gear tooth 2201.

Referring to FIG. 2C, at block S3, a second position B of the first gear 210 is obtained based on contact between the second gear tooth 2102 and the third gear tooth 2201.

The second position B of the first gear 210 when the second gear tooth 2102 contacts the third gear tooth 2201 for the first time is an angular value. Also select the reference point S as a position recording point, the position of the reference point S is the second position B when the second gear tooth 2102 contacts the third gear tooth 2201 for the first time.

Figure 1:
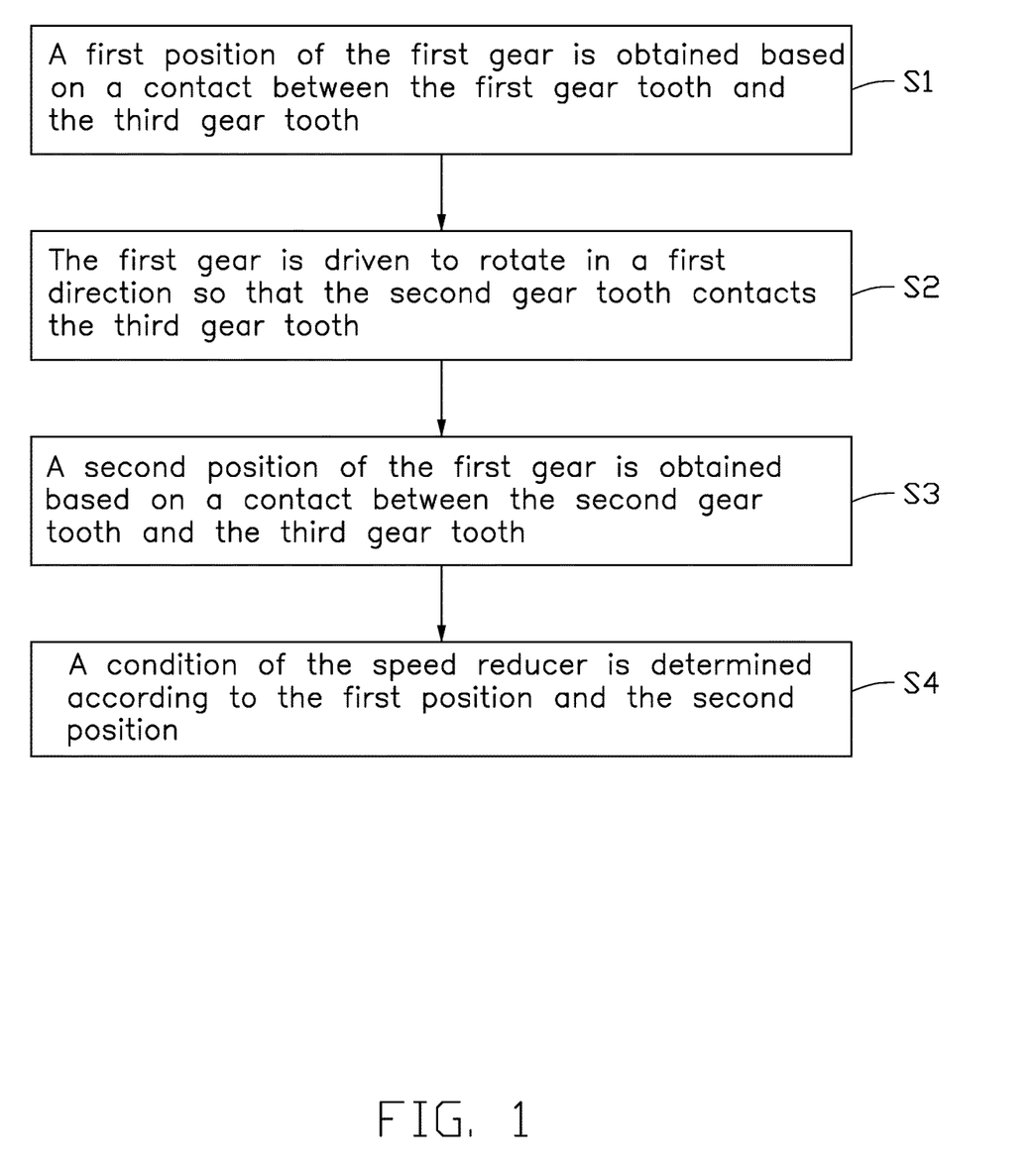
FIG. 1 is a flowchart diagram of a first embodiment of an inspection method for a speed variator (for instance, a speed reducer).

At block S4, a condition of the speed reducer 200 is determined according to the first position A and the second position B.

In one embodiment, the condition of the speed reducer includes a wear condition of the speed reducer, which is usually reflected by a backlash value of the speed reducer 200. The backlash value indicates a mechanical dead zone exists when the motor rotates but the robot body 300 does not move, and the motor rotates to a same position from different directions, but the robot body 300 does not return to a same position, which ultimately affects a controllable accuracy of the robot body. In other embodiments, the condition of the speed reducer also includes a condition during production of the speed reducer. The condition during production may include whether the backlash value is qualified when the speed reducer is shipped from a factory, the backlash value also can be accounted by the blocks S1-S4.

In one embodiment, the backlash value is an idle rotation angle of the first gear 210 and obtained according to the first position A and the second position B, which is also called backlash value. The method for inspecting wear condition of the speed reducer 200 is easy to implement, and the wear condition of the speed reducer 200 can be determined merely according to the contact of the first gear tooth 2101 and the second gear tooth 2102 with the third gear tooth 2201. Moreover, the speed reducer 200 is used in the field of robotics, and the inspection method of the speed reducer 200 does not introduce external components, and the cost is low.

In other embodiments, the first gear tooth 2101 and the second gear tooth 2102 can be arranged counterclockwise.

FIG. 3 and FIGS. 4A-4C show a second embodiment of an inspection method of a speed reducer 200. The speed reducer 200 is applied in a robot body 300. The inspection method is configured to inspect a wear condition of the speed reducer 200.

Figure 4A:
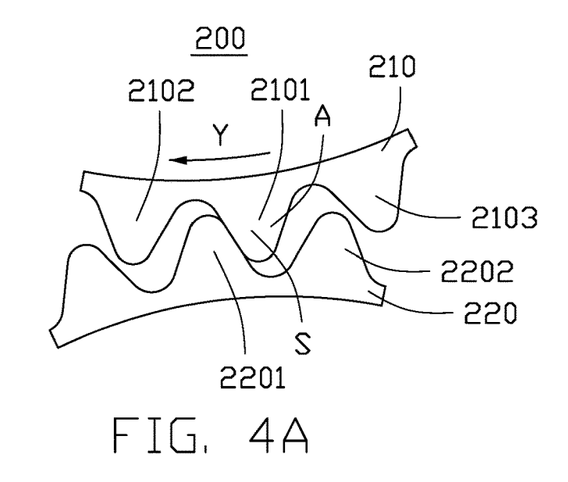
FIGS. 4A-4C are schematic diagrams of a first gear of the speed reducer rotating relative to a second gear of the speed reducer according to the second embodiment of the inspection method.
Figure 4B:
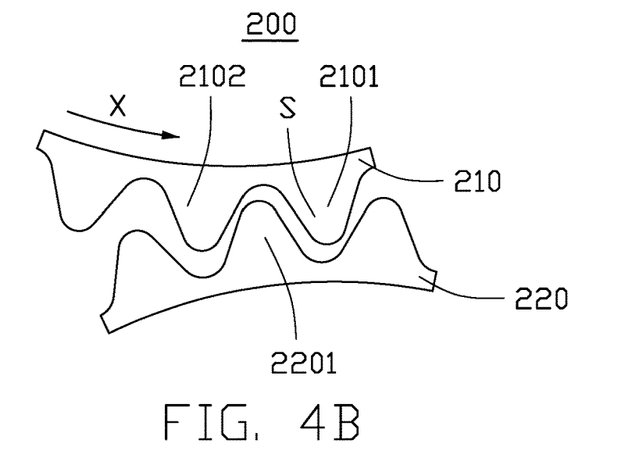
Figure 4C:
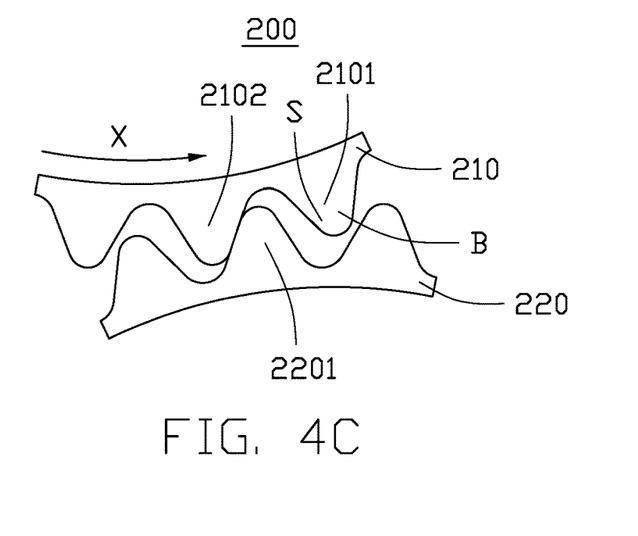

The speed reducer 200 includes a first gear 210 and a second gear 220. The first gear 210 includes a first gear tooth 2101 and a second gear tooth 2102 adjacent to the first gear tooth 2101. The second gear 220 includes a third gear tooth 2201. The second gear 220 is configured to move under a driving force of the first gear 210. The first gear 210 is coupled to a motor, and the second gear 220 is coupled to the robot body 300.

Figure 3:
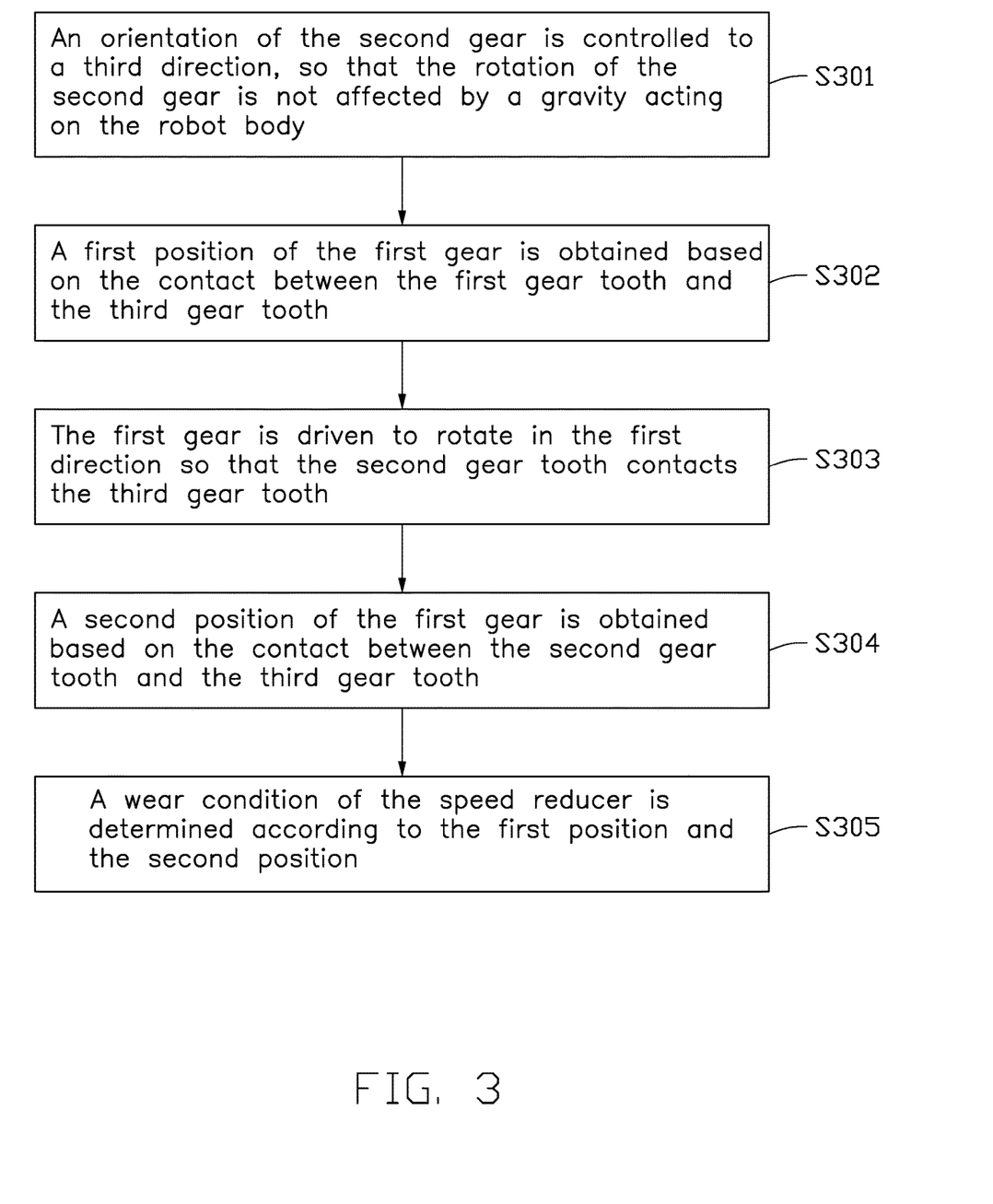
FIG. 3 is a flowchart diagram of a second embodiment of an inspection method for a speed reducer.

At block S301, an orientation of the second gear 220 is controlled to a third direction, so that the rotation of the second gear 220 is not affected by a gravity acting on the robot body 300.

Since the second gear 220 is coupled to the robot body 300, in order to prevent the rotation of the second gear 220 from being affected by the gravity acting on the robot body 300, the orientation of the second gear 220 can be controlled so that the rotation of the second gear 220 is not affected by the gravity acting on the body 300. For example, when the robot body 300 is oriented vertically, the rotation of the second gear 220 is not affected by gravity. In one embodiment, the third direction is a direction in which a small rotation of the second gear 220 is not affected by the gravity acting on the robot body 300.

Referring to FIG. 4A, at block S302, a first position A of the first gear 210 is obtained based on the contact between the first gear tooth 2101 and the third gear tooth 2201. At this moment, the third gear tooth 2201 is located between the first gear tooth 2101 and the second gear tooth 2102.

In one embodiment, bringing the first gear tooth 2101 of the first gear 210 into contact with the third gear tooth 2201 of the second gear 220 to obtain the first position A of the first gear 210 comprises:

driving the first gear to rotate in a second direction Y and stopping driving. For example, driving the first gear to rotate toward the second gear until the first gear comes to contact the second gear and stopping driving, obtaining the first position based on the contact between the first gear tooth and the third gear tooth, after the first gear and the second gear become stationary. The second direction Y is a direction in which the first gear tooth 2102 moves toward the third gear tooth 2201. In one embodiment, the first gear 210 is driven to rotate slowly and uniformly until the first gear tooth 2101 contacts or slightly pushes the third gear tooth 2201, so that the second gear 220 does not continue to rotate after the first gear tooth 2101 contacts the third gear tooth 2201, in an embodiment, when the first gear 210 and the second gear 220 are stationary, there is gear tooth named the first gear tooth 2102 contacts the third gear tooth 2201. So it is not necessary to drive the first gear 210 to rotate any more to obtain the first position A of the first gear 210.

Referring to FIG. 4B, at block S303, the first gear 210 is driven to rotate in the first direction X so that the second gear tooth 2102 contacts the third gear tooth 2201. The first direction X is counter to the second direction Y.

Due to the backlash of the speed reducer 200, when the first gear 210 initially rotates in the first direction X, the first gear 210 will not contact and drive the second gear 220 to rotate. That is, the motor drives the first gear 210 to rotate idly within some angle. The first gear is driven to rotate slowly at a constant speed in the first direction X so that the second gear tooth 2102 is driven slowly toward the third gear tooth 2201 to avoid excessive idle driving torque until the second gear tooth 2102 contacts or slightly pushes the third gear tooth 2201, so that a state of the second gear tooth 2102 contacting or slightly pushing the third gear tooth 2201 can be determined accurately.

Referring to FIG. 4C, at block S304, a second position B of the first gear 210 is obtained based on the contact between the second gear tooth 2102 and the third gear tooth 2201.

In one embodiment, the second position B of the first gear 210 is obtained by first obtaining a driving torque of the first gear 210, determining a contact between the second gear tooth 2102 and the third gear tooth 2201 according to the change in driving torque and a threshold value of the change amount, and then obtaining the second position B of the first gear 210 based on the position where contact between the second gear tooth 2102 and the third gear tooth 2201 is initially inspected.

When gear teeth of the first gear 210 do not contact gear teeth of the second gear 220, the motor only needs to drive the first gear 210 to rotate idly and slowly, so a required driving torque is relatively small. When the second gear tooth 2102 contacts the third gear tooth 2201, the motor needs to drive the first gear 210 to drive the second gear 220 and the robot body 300 coupled to the second gear 220 to rotate, the driving torque of the motor will suddenly increase to maintain continuous rotation.

Figure 6:
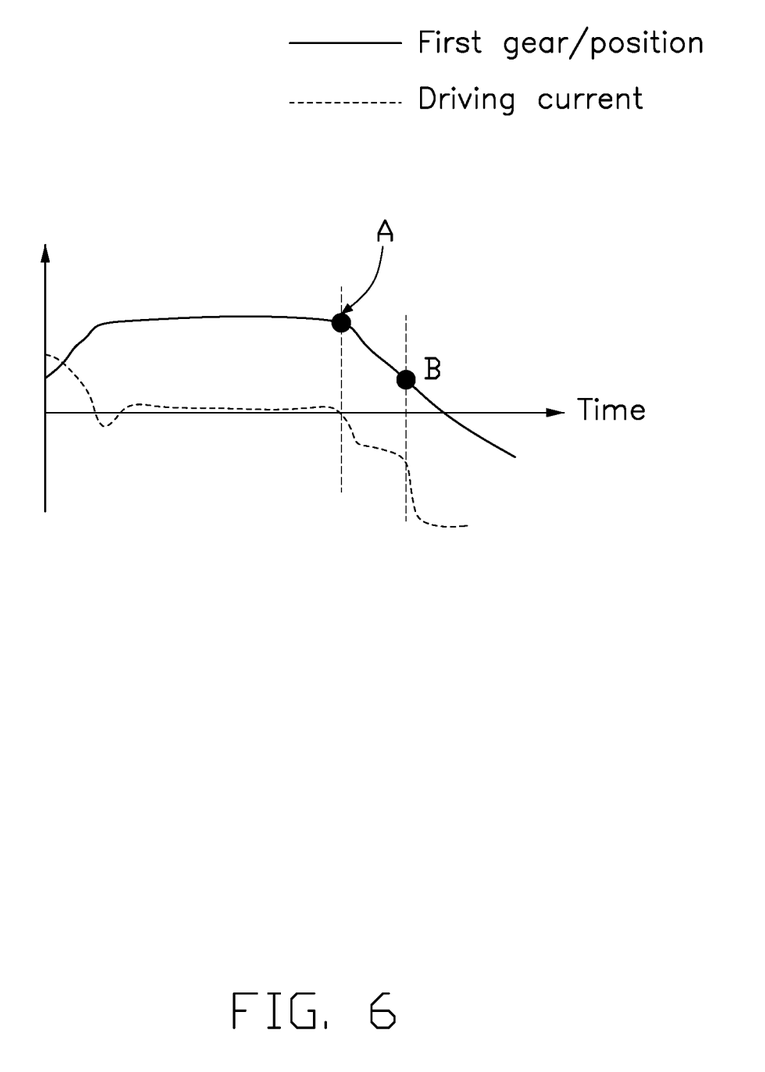
FIG. 6 is a schematic diagram showing a graph of a position of the first gear and a driving current of a motor.

Since the driving torque of the motor is proportional to the driving current of the motor, contact between the second gear tooth 2102 and the third gear tooth 2201 can be determined by a sudden increase in driving current. FIG. 6 is a schematic diagram showing a graph of a position of the first gear 210 and a driving current of the motor. The motor first drives the first gear 210 to rotate in the second direction Y and then stops; after the first gear 210 and the second gear 220 are stationary, the first gear tooth 2101 contacts the third gear tooth 2201 and the first gear 210 is in the first position A. Next, the motor drives the first gear 210 to slowly rotate in the first direction X using a small amount of driving current. When the second gear tooth 2102 contacts the third gear tooth 2201, the driving current required to maintain rotation of the first gear 210 increases suddenly and the first gear 210 is in the second position B. Contact between the second gear tooth 2102 and the third gear tooth 2201 is determined by the sudden increase in the driving current.

At block S305, a wear condition of the speed reducer 200 is determined according to the first position A and the second position B.

In one embodiment, the wear condition of the speed reducer 200 is determined according to a position difference between the first position A and the second position B.

In one embodiment, the position difference between the first position A and the second position B is an angular difference, which is an angular travel distance within which the first gear 210 is rotating idly, that is, the backlash value of the speed reducer 200. For example, when the angular value of the first gear 210 is five degrees in the first position A, and the angular value of the first gear 210 is six degrees in the second position B, then the angular difference is one degree, that is, the backlash value is one degree. In other embodiments, the position difference between the first position A and the second position B may also be a linear travel difference, a displacement difference, or the like.

Figure 5:
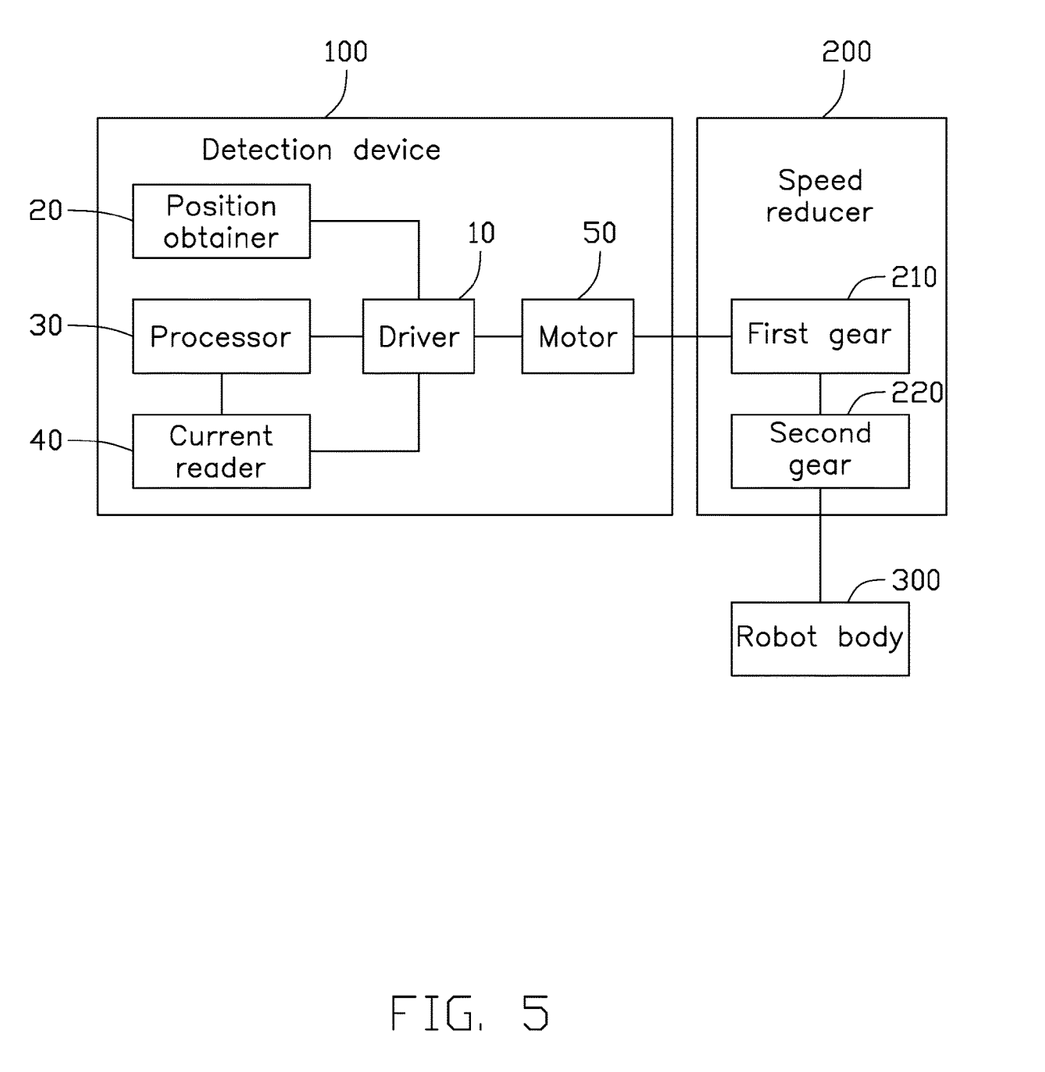
FIG. 5 is a schematic block diagram of a first embodiment of an inspection device and a speed variator (for instance, a speed reducer).

Referring to FIG. 5, in one embodiment, an inspection device 100 is provided for the speed reducer 200, which is configured to inspect the condition of the speed reducer 200, and the condition includes condition in the production phase or wear of the speed reducer 200 in usage phase. The speed reducer 200 includes the first gear 210 and the second gear 220. The first gear 210 includes an adjacent first gear tooth 2101 and second gear tooth 2102. The second gear 220 includes a third gear tooth 2201. The second gear 220 is configured to move under the driving force of the first gear 210.

The inspection device 100 includes a driver 10, a motor 50, a position obtainer 20, a processor 30, and a current reader 40. The driver 10 is coupled to the motor 50 for driving the motor 50 to rotate. The motor 50 is coupled to the first gear 210 and drives the first gear 210 to rotate. The position obtainer 20 is configured to obtain the first position A of the first gear 210 based on the contact between the first gear tooth 2101 and the third gear tooth 2201. The processor 30 is configured to control the driver 10 to drive the first gear 210 to rotate in the first direction X, so that the second gear tooth 2102 contacts the third gear tooth 2201. The current reader 40 is configured to read the driving current.

The position obtainer 20 is also configured to obtain the second position B of the first gear 210 based on the contact between the second gear tooth 2102 and the third gear tooth 2201, and the processor is configured to determine the condition of the speed reducer 200 based on the first position A and the second position B. In one embodiment, the position obtainer 20 is an encoder that senses a rotation angle of the motor. The value of the encoder can represent the position of the first gear 210.

In one embodiment, the processor 30 can determine a contact state between the first gear 210 and the second gear 220 and control the driver 10 to start or stop according to the change in the driving current and a threshold value of the change amount. In one embodiment, the processor 30 first obtains the driving current of the driver 10, and then obtains the change amount of the driving current through analysis and calculation. The change amount of the driving current may be a change rate, and the corresponding threshold value of the change amount may be a threshold value of the change rate.

In one embodiment, the processor 30, the position obtainer 20, the driver 10, and the current reader 40 may all be part of a robot controller. In other embodiments, the processor 30, the position obtainer 20, the driver 10, and the current reader 40 may be part of an external controller.

In one embodiment, the processor 30 is further configured to determine the wear condition of the speed reducer 200 according to the first position A and the second position B.

The speed reducer 200 is used in the field of robotics, and the driver 10, the motor 50, the position obtainer 20, and the processor 30 can all be components integrated with the robot itself without external components to obtain the backlash value of the speed reducer 200. Thus, the operation is simple and the cost is low.

Figure 7:
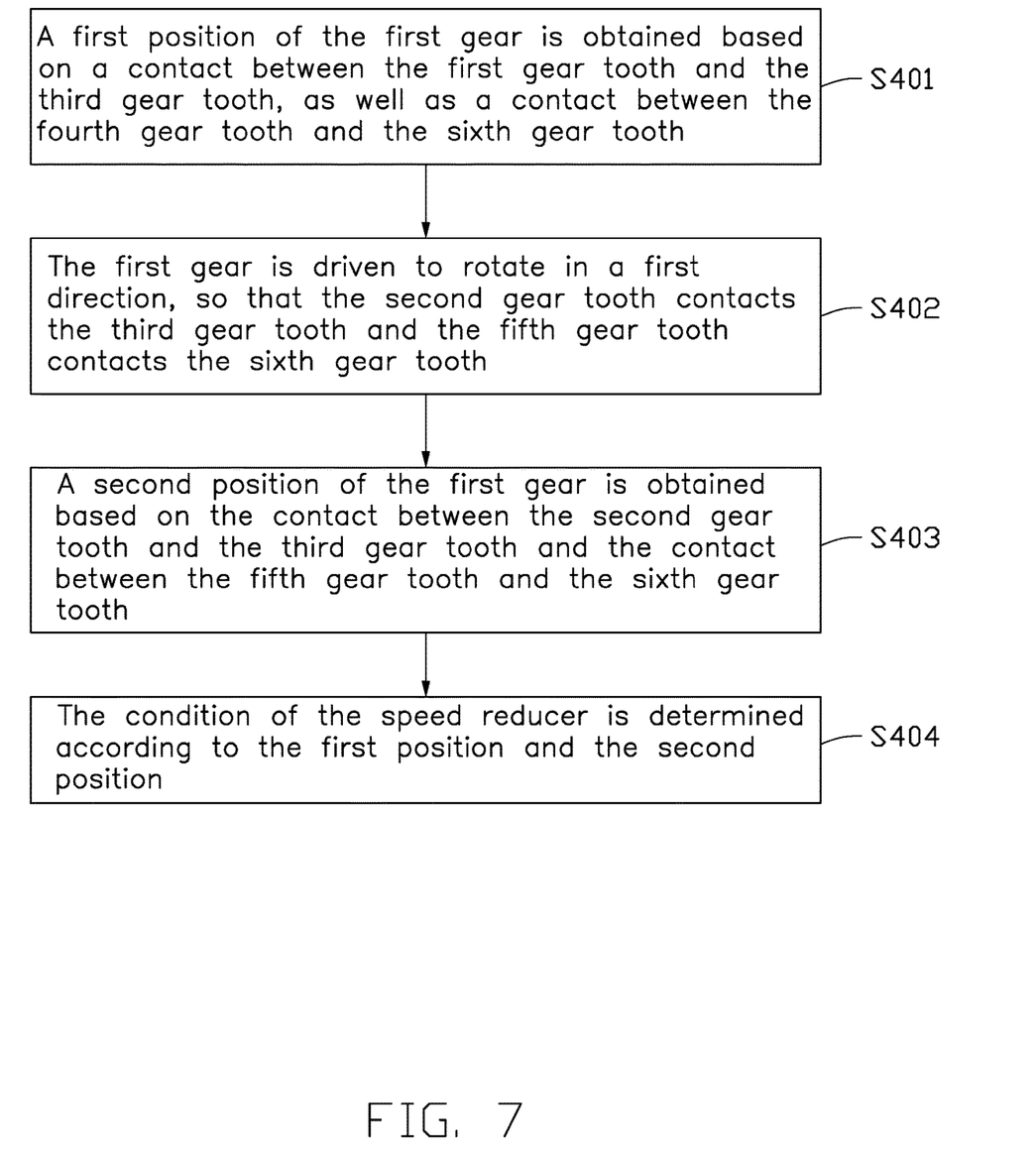
FIG. 7 is a flowchart diagram of a third embodiment of an inspection method for a speed reducer.
Figure 8:
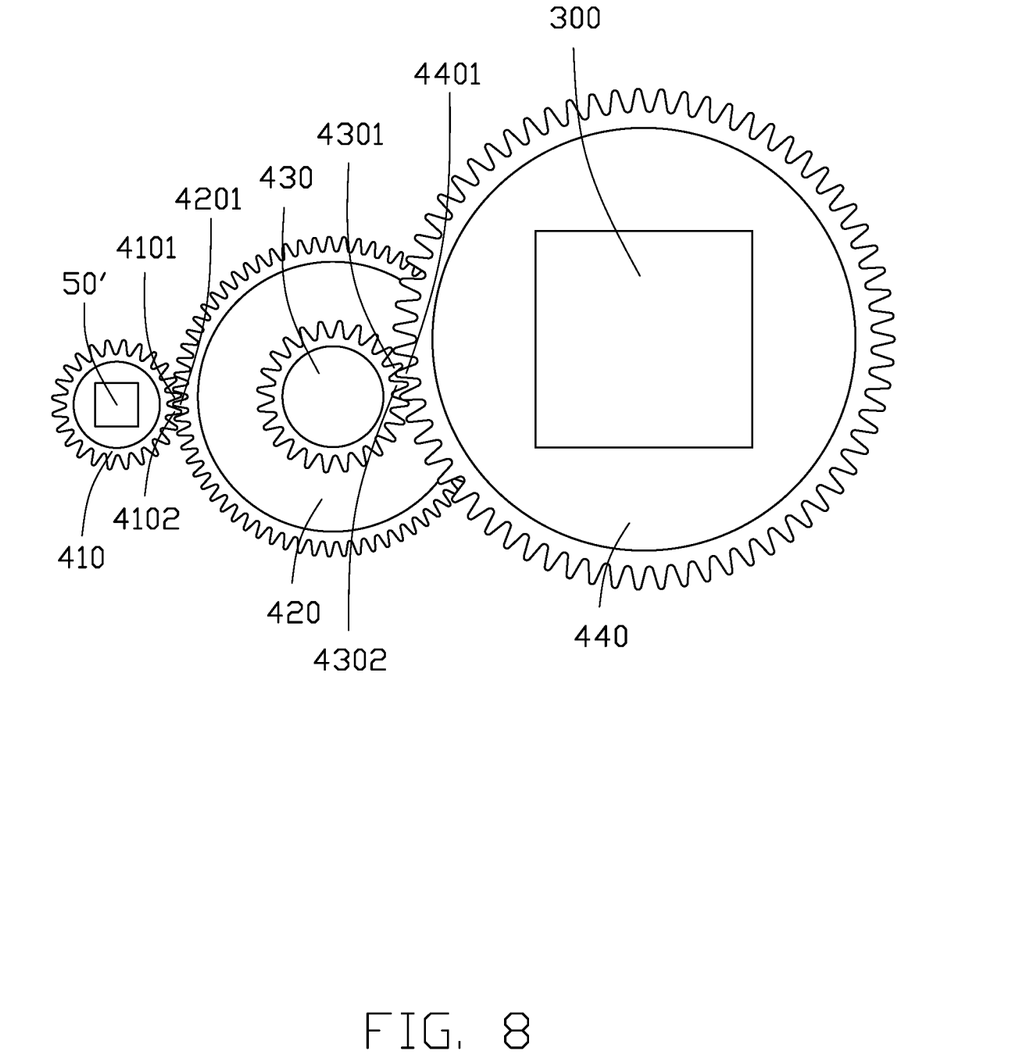
FIG. 8 is a schematic diagram of the speed reducer, a motor, and a robot body.

FIG. 7 and FIG. 8 show a third embodiment of an inspection method for a speed reducer 400. The speed reducer 400 includes a first gear 410, a second gear 420, a third gear 430, and a fourth gear 440. The first gear 410 includes an adjacent first gear tooth 4101 and a second gear tooth 4102. The second gear 420 includes a third gear tooth 4201. The second gear 420 is configured to rotate under a driving force of the first gear 410. The third gear 430 and the second gear 420 rotate together coaxially. The fourth gear 440 is configured to rotate under a driving force of the third gear 430. The third gear 430 includes an adjacent fourth gear tooth 4301 and a fifth gear tooth 4302. The fourth gear 440 includes a sixth gear tooth 4401. The first gear 410 is coupled to a motor 50', and the fourth gear 440 is coupled to the robot body 300. In order to better clarify the inspection method, the third gear tooth 4201 is located between the first gear tooth 4101 and the second gear tooth 4102, and the sixth gear tooth 4401 is located between the fourth gear tooth 4301 and the fifth gear tooth 4302. That is, before inspection method the condition of the speed reducer, the first gear tooth 4101 and a second gear tooth 4102 are selected among the gear teeth of the first gear 410; the third gear tooth 4201 is selected among the gear teeth of the second gear 420 to have the third gear tooth 4201 located between the first gear tooth 4101 and a second gear tooth 4102; the fourth gear tooth 4301 and the fifth gear tooth 4302 are selected among the gear teeth of the third gear 430; and the sixth gear tooth 4401 is selected among the gear teeth of the fourth gear 440 to have the sixth gear tooth 4401 located between the fourth gear tooth 4301 and the fifth gear tooth 4302.

At block S401, a first position of the first gear 410 is obtained based on a contact between the first gear tooth 4101 and the third gear tooth 4201, as well as a contact between the fourth gear tooth 4301 and the sixth gear tooth 4401.

The contact between the first gear tooth 4101 and the third gear tooth 4201 and the contact between the fourth gear tooth 4301 and the sixth gear tooth 4401 includes two states. A first state is that the fourth gear tooth 4301 contacts the sixth gear tooth 4401 after the first gear tooth 4101 contacts the third gear tooth 4201. The second state is that the fourth gear tooth 4301 contacts the sixth gear tooth 4401 at the same time as the first gear tooth 4101 contacts the third gear tooth 4201.

In one embodiment, the first gear 410 is driven to rotate in a second direction. The second direction is a direction in which the first gear tooth 4101 moves toward and contacts the third gear tooth 4201. After the first gear tooth 4101 contacts the third gear tooth 4201, the first gear 410 continues to drive the second gear 420 to rotate in the second direction. At the same time, the second gear 420 causes the third gear 430 to rotate in the second direction. When the fourth gear tooth 4301 contacts the sixth gear tooth 4401, the first gear 410 is stopped being driven. It can be understood that after the first gear tooth 4101 contacts the third gear tooth 4201, and these teeth become separated when the first gear 410 continues to rotate, the next adjacent gear teeth of the first gear 410 and the second gear 420 are redefined as the corresponding first gear tooth 4101, third gear tooth 4201, and second gear tooth 4102. In at least one embodiment, when the first gear 410 is at rest, the first gear tooth 4101 is in contact with the third gear tooth 4201, and the fourth gear tooth 4301 is in contact with the sixth gear tooth 4401. In this state, the first position of the first gear 410 can be directly obtained without driving the first gear 410 to rotate.

At block S402, the first gear 410 is driven to rotate in a first direction, so that the second gear tooth 4102 contacts the third gear tooth 4201, and the fifth gear tooth 4302 contacts the sixth gear tooth 4401.

Due to the backlash of the speed reducer 400, the second gear tooth 4102 needs to rotate a certain angle before contacting the third gear tooth 4201 to drive the second gear 420 to rotate, and after the second gear 420 and the third gear 430 rotate together coaxially, the fifth gear tooth 4302 needs to rotate a certain angle before contacting the sixth gear tooth 4401 to drive the fourth gear 440 and the robot body 300 to rotate. Before the fifth gear tooth 4302 contacts the sixth gear tooth 4401, the motor 50' merely needs to drive the first gear 410, second gear 420 and third gear 430 to rotate idly without driving the robot body, so that the required torque and the corresponding driving current are relatively small.

At block S403, a second position of the first gear 410 is obtained based on the contact between the second gear tooth 4102 and the third gear tooth 4201 and the contact between the fifth gear tooth 4302 and the sixth gear tooth 4401.

Similarly, the contact between the second gear tooth 4102 and the third gear tooth 4201 and the contact between the fifth gear tooth 4302 and the sixth gear tooth 4401 have two states. A first state is that the fifth gear tooth 4302 contacts the sixth gear tooth 4401 after the second gear tooth 4102 contacts the third gear tooth 4201. A second state is that the fifth gear tooth 4302 contacts the sixth gear tooth 4401 at the same time as the second gear tooth 4102 contacts the third gear tooth 4201. When the gear teeth of the first gear 410 do not contact the gear teeth of the second gear 420 or the gear teeth of the third gear 430 do not contact the gear teeth of the fourth gear 440, the motor 50' only needs to drive the gears to rotate idly, so a required driving torque of the motor 50' is relatively small. When the second gear tooth 4102 contacts the third gear tooth 4201 and the fifth gear tooth 4302 contacts the sixth gear tooth 4401, the motor 50' drives the robot body 300 to rotate, and the required torque of the motor 50' and the corresponding driving current will sharply increase.

At block S404, the condition of the speed reducer 400 is determined according to the first position and the second position. In one embodiment, the condition of the speed reducer 400 includes the wear condition of the speed reducer 400. An angular difference between the first position and the second position is an idle angle of the speed reducer 400, that is, the backlash value of the speed reducer 400.

Figure 9:
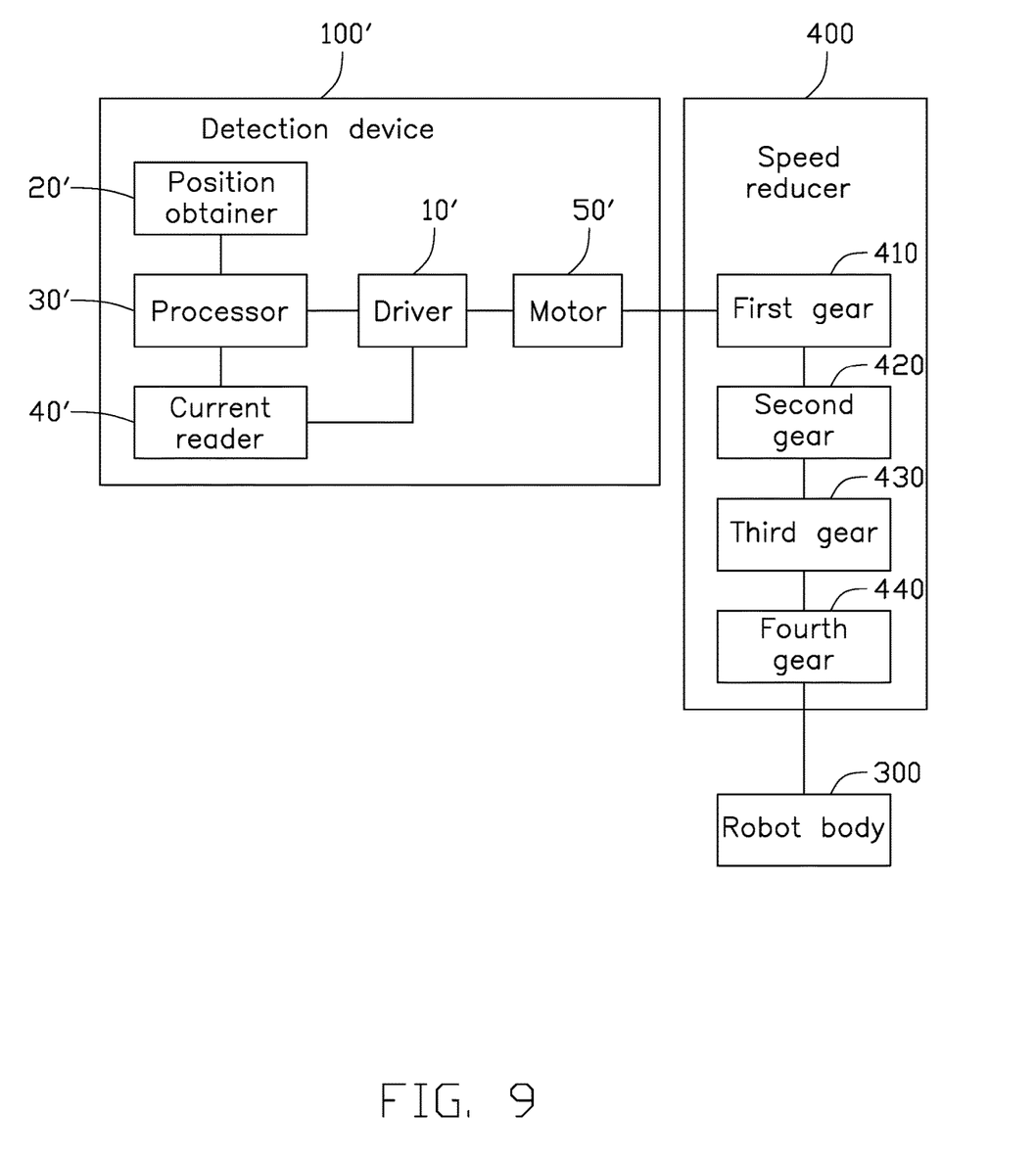
FIG. 9 is a schematic block diagram of a second embodiment of an inspection device and a speed reducer.

Referring to FIG. 9, an inspection device 100' is provided for the speed reducer 400. The speed reducer 400 includes the first gear 410, the second gear 420, the third gear 430, and the fourth gear 440. The first gear 410 includes the adjacent first gear tooth 4101 and second gear tooth 4102. The second gear 420 includes the third gear tooth 4201. The second gear 420 is configured to rotate under the driving force of the first gear 410. The third gear 430 and the second gear 420 rotate together coaxially. The fourth gear 440 is configured to rotate under the driving force of the third gear 430. The third gear 430 includes the adjacent fourth gear tooth 4301 and fifth gear tooth 4302, and the fourth gear 440 includes the sixth gear tooth 4401. The first gear 410 is coupled to the motor 50', and the fourth gear 440 is coupled to the robot body 300.

In other embodiments, the speed reducer 400 may also include a fifth gear and a sixth gear.

In one embodiment, the inspection device 100' of the speed reducer 400 includes a driver 10', a position obtainer 20', a processor 30', and a current reader 40'.

The driver 10' is configured to drive the first gear 410 to rotate. The position obtainer 20' is configured to obtain the first position of the first gear 410 based on the contact between the first gear tooth 4101 and the third gear tooth 4201, the contact between the fourth gear tooth 4301 and the sixth gear tooth 4401. The processor 30' is coupled to the driver 10', and the position obtainer 20', the processor 30' is configured to control the driver 10' to drive the first gear 410 to rotate in the first direction, so that the second gear tooth 4102 contacts the third gear tooth 4201.

The position obtainer 20' is further configured to obtain the second position of the first gear 410 based on the contact between the fifth gear tooth 4302 and the sixth gear tooth 4401 after the second gear tooth 4102 contacts the third gear tooth 4201. The processor 30' is further configured to determine the condition of the speed reducer 400 according to the first position and the second position.

The position obtainer 20' is configured to obtain the first position and the second position. The first position is when the first gear tooth 4101 contacts the third gear tooth 4201, and the fourth gear tooth 4301 contacts the sixth gear tooth 4401. At this time, the third gear tooth 4201 is located between the first gear tooth 4101 and the second gear tooth 4102, and the sixth gear tooth 4401 is located between the fourth gear tooth 4301 and the fifth gear tooth 4302. The second position is when the second gear tooth 4102 contacts the third gear tooth 4201 and the fifth gear tooth 4302 contacts the sixth gear tooth 4401.

It can be understood that the inspection device 100' may also include a motor 50'. The driver 10' is coupled to the motor 50', and the motor 50' is coupled to the first gear 410. The processor 30' can determine the contact state between the gears and control the driver 10' to start or stop according to the change of the driving current of driving the motor 50'.

The inspection method can obtain the idle angle of the speed reducer 400 according to the first position and the second position, that is, the backlash value of the speed reducer 400, so that the condition of the speed reducer 400 can be determined. The inspection method of the condition of speed reducer 400 is easy to operate, the inspection device 100' does not require external inspection devices, and the cost is low.

In other embodiments, the inspection method and inspection devices 100, 100' can be used in other fields where the second or fourth gear is coupled to other loads or a non-robot body, as well as speed-increasing gears, speed converters, and speed reducer containing more gears or other gear structures.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An inspection method for a speed variator comprising a first gear and a second gear, the first gear comprising an adjacent first gear tooth and second gear tooth, and the second gear comprising a third gear tooth located between the first gear tooth and the second gear tooth, the inspection method comprising:
    obtaining a first position of the first gear based on a contact between the first gear tooth and the third gear tooth;
    driving the first gear to rotate in a first direction to bring the second gear tooth into contact with the third gear tooth;
    obtaining a second position of the first gear based on the contact between the second gear tooth and the third gear tooth; and
    determining a condition of the speed variator based on the first position and the second position.

2. The inspection method of claim 1, wherein obtaining the second position of the first gear comprises:
    obtaining a change amount of a driving torque or driving current of the first gear;
    determining the second gear tooth being in contact with the third gear tooth according to the change amount and a threshold value of the change amount; and
    obtaining the second position of the first gear based on the contact between the second gear tooth and the third gear tooth.

3. The inspection method of claim 1, wherein obtaining the first position of the first gear comprises:
    driving the first gear to rotate in a second direction counter to the first direction;
    stopping driving when ensuring that upon a stop of the first gear and the second gear, the first gear tooth contacts the third gear tooth; and
    obtaining the first position based on the contact between the first gear tooth and the third gear tooth.

4. The inspection method of claim 1, wherein:
    the first position and the second position has an angular difference, the angular difference is an angular travel distance within the first gear rotating idly.

5. The inspection method of claim 1, wherein the speed variator further comprises a third gear, and a fourth gear, the third gear is configured to rotate together coaxially with the second gear, the third gear comprises an adjacent fourth gear tooth and fifth gear tooth, the fourth gear comprises a sixth gear tooth located between the fourth gear tooth and the fifth gear tooth, the inspection method further comprises:
    obtaining a first position of the first gear based on a contact between the first gear tooth and the third gear tooth and a contact between the fourth gear tooth and the sixth gear tooth;
    driving the first gear to rotate in a first direction to bring the second gear tooth into contact with the third gear tooth, and then or simultaneously, the fifth gear tooth into contact with the sixth gear tooth;
    obtaining a second position of the first gear based on a contact between the fifth gear tooth and the sixth gear tooth; and
    determining a condition of the speed variator based on the first position and the second position.

6. The inspection method of claim 5, wherein obtaining the second position of the first gear comprises:
    obtaining a change amount of a driving torque or driving current of the first gear;
    determining the fifth gear tooth being in contact with the sixth gear tooth that occurs after or when the second gear tooth contacts the third gear tooth, according to the change amount and a threshold value of the change amount; and
    obtaining the second position of the first gear based on the contact between the fifth gear tooth and the sixth gear tooth.

7. An inspection device for a speed variator wherein the speed variator comprises a first gear and a second gear, the first gear comprising an adjacent first gear tooth and second gear tooth, and the second gear comprising a third gear tooth located between the first gear tooth and the second gear tooth, the inspection device comprising:
    a position obtainer configured to obtain a first position and a second position of the first gear;
    a driver coupled to the position obtainer and configured to drive the first gear to rotate in a first direction; and
    a processor coupled to the driver, the processor being configured to control the driver and determine a condition of the speed variator according to the first position and second position of the first gear, wherein:
    the position obtainer obtains the first position of the first gear based on a contact between the first gear tooth and the third gear tooth and obtains the second position of the first gear based on a contact between the second gear tooth and the third gear tooth.

8. The inspection device of claim 7, wherein:
    the processor determines that the second gear tooth is in contact with the third gear tooth according to a change amount of a driving torque or driving current of the first gear and a threshold value of the change amount.

9. The inspection device of claim 7, wherein:
    the speed variator further comprises a third gear and a fourth gear;
    the third gear is configured to rotate together coaxially with the second gear;
    the third gear comprises an adjacent fourth gear tooth and fifth gear tooth;

the fourth gear comprises a sixth gear tooth located between the fourth gear tooth and fifth gear tooth;

the position obtainer obtains the first position of the first gear based on a contact between the first gear tooth and the third gear tooth, and a contact between the fourth gear tooth and the sixth gear tooth; and the position obtainer obtains the second position of the first gear based on a contact between the second gear tooth and the third gear tooth and a contact between the fifth gear tooth and the sixth gear tooth.

10. The inspection device of claim 7, wherein:

the first gear is coupled to a motor;

the inspection device further comprises a driver, the driver is coupled to the motor for driving the motor to rotate.

* * * * *